(12) United States Patent
Miko et al.

(10) Patent No.: US 12,377,462 B2
(45) Date of Patent: Aug. 5, 2025

(54) METHOD FOR MANUFACTURING PRECIOUS METAL ALLOYS AND PRECIOUS METAL ALLOYS THUS OBTAINED

(71) Applicant: The Swatch Group Research and Development Ltd, Marin (CH)

(72) Inventors: Csilla Miko, Essertines-sur-Yverdon (CH); Rémi Grosjean, Bienne (CH); Jean-Luc Bazin, Tuscherz-Alfermee (CH); David Portehault, Villejuif (FR); Yann Le Godec, Paris (FR); Simon Delacroix, Orgeres (FR); Fernando Igoa Saldana, Paris (FR)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 17/058,424

(22) PCT Filed: Dec. 5, 2019

(86) PCT No.: PCT/EP2019/083802
§ 371 (c)(1),
(2) Date: Nov. 24, 2020

(87) PCT Pub. No.: WO2020/115201
PCT Pub. Date: Jun. 11, 2020

(65) Prior Publication Data
US 2021/0371955 A1    Dec. 2, 2021

(30) Foreign Application Priority Data
Dec. 7, 2018 (EP) .................... 18210947

(51) Int. Cl.
| | |
|---|---|
| B22F 3/15 | (2006.01) |
| B22F 1/07 | (2022.01) |
| B22F 3/10 | (2006.01) |
| B22F 3/105 | (2006.01) |
| B22F 10/12 | (2021.01) |
| B22F 10/14 | (2021.01) |
| B22F 10/16 | (2021.01) |
| B22F 10/18 | (2021.01) |
| B22F 10/20 | (2021.01) |
| B22F 10/28 | (2021.01) |
| B22F 10/34 | (2021.01) |
| B33Y 10/00 | (2015.01) |
| B33Y 70/00 | (2020.01) |
| B82Y 40/00 | (2011.01) |
| C22C 1/04 | (2023.01) |
| C22C 1/051 | (2023.01) |
| C22C 5/02 | (2006.01) |

(52) U.S. Cl.
CPC .............. *B22F 3/15* (2013.01); *B22F 1/07* (2022.01); *B22F 3/1007* (2013.01); *B22F 3/105* (2013.01); *B22F 10/12* (2021.01); *B22F 10/14* (2021.01); *B22F 10/16* (2021.01); *B22F 10/18* (2021.01); *B22F 10/20* (2021.01); *B22F 10/28* (2021.01); *B22F 10/34* (2021.01); *B33Y 70/00* (2014.12); *C22C 1/0466* (2013.01); *C22C 1/051* (2013.01); *C22C 5/02* (2013.01); *B33Y 10/00* (2014.12); *B82Y 40/00* (2013.01)

(58) Field of Classification Search
CPC .................................................... C22C 1/0466
See application file for complete search history.

(56) References Cited

U.S. PATENT DOCUMENTS

| | | |
|---|---|---|
| 3,211,550 A | 10/1965 | Bernstein |
| 2010/0119400 A1 | 5/2010 | Prasad et al. |
| 2017/0164700 A1 | 6/2017 | Zito |
| 2018/0169620 A1 | 6/2018 | Sanchez et al. |

FOREIGN PATENT DOCUMENTS

| | | |
|---|---|---|
| CN | 1071968 A | 5/1993 |
| CN | 101386928 A | 3/2009 |
| CN | 101530918 A | 9/2009 |
| CN | 102510907 A | 6/2012 |

(Continued)

OTHER PUBLICATIONS

Chris Schade, Introduction to Metal Powder Production and Characterization, Powder Metallurgy, vol. 7, ASM Handbook, Edited by P. Samal, J. Newkirk, ASM International, 2015, p. 55-57, (Year: 2015).*

(Continued)

*Primary Examiner* — Keith D. Hendricks
*Assistant Examiner* — Joshua S Carpenter
(74) *Attorney, Agent, or Firm* — Oblon, McClelland, Maier & Neustadt, L.L.P.

(57) ABSTRACT

A method for manufacturing a part by alloying a precious metal with boron, wherein: a quantity of precious metal reduced to powder form is provided; a quantity of a nano-structured micrometric boron powder is provided; the precious metal powder is mixed with the nano-structured micrometric boron powder to obtain a mixture; the mixture is compacted by applying a uniaxial pressure; the mixture is subjected to a spark plasma sintering or flash sintering treatment, or to a hot isostatic pressing (HIP) treatment, to obtain an ingot of a precious metal/boron alloy, and the ingot is machined to obtain the part, or the ingot is reduced to powder form by a micronisation treatment and the powder is treated to obtain the part. Additionally, a gold/boron alloy.

26 Claims, No Drawings

(56) References Cited

FOREIGN PATENT DOCUMENTS

| CN | 103898460 A | | 7/2014 | |
|---|---|---|---|---|
| CN | 107385243 A | * | 11/2017 | ............... C22C 1/02 |
| CN | 108164267 A | | 6/2018 | |
| DE | 102018101391 A1 | * | 7/2018 | |
| WO | WO-2016068362 A1 | * | 5/2016 | ............. C23C 14/14 |
| WO | WO-2017112499 A1 | * | 6/2017 | ................ B22F 3/16 |

OTHER PUBLICATIONS

Gibson et al. "Additive manufacturing technologies: 3D printing, rapid prototyping, and direct digital manufacturing." (2015). (Year: 2015).*
Espacenet Machine translation of WO 2016068362 A1 retrieved on Jun. 30, 2022 (Year: 2016).*
Espacenet Machine translation of CN-107385243-A retrieved on Jun. 30, 2022 (Year: 2017).*
Espacenet Machine translation of DE 102018101391 A1 retrieved on Jun. 30, 2022 (Year: 2018).*
International Search Report issued Feb. 24, 2020 in PCT/EP2019/083802 filed Dec. 5, 2019, 3 pages.
Suss, R., et al., "18 Carat Yellow Gold Alloys with Increased Hardness", Gold Bulletin, XP002713239, 2004, pp. 196-207.
Okamoto, H., et al., "Phase Equilibria, Crystallographic and Thermodynamic Data of Binary Alloys", Au—X binary systems, XP055669250, 1 total page.
International Preliminary Report on Patentability and Written Opinion issued Jun. 8, 2021 in PCT/EP2019/083802 (with English translation of Written Opinion only), 10 pages.
Japanese Office Action issued Aug. 23, 2022 in Japanese Patent Application No. 2020-570435 (with English translation).
Qiang, C., et al., On the structures and bonding in boron-gold alloy clusters: $B_6Au_n$—and $B_3Au_n$ (n=1-3), The Journal of Chemical Physics, Feb. 19, 2013, 138, 084306-1 to 084306-8 (cited anew), 9 pages.
Combined Chinese Office Action and Search Report issued Jun. 30, 2022 in Patent Application No. 201980048596.3 (with English language translation and English translation of Category of Cited Documents), 15 pages.
Remi Grosjean, "Boron-based nanomaterials under extreme conditions," Universite Pierre et Marie Curie—Paris VI, Oct. 17, 2016, 184 pages.
Office Action issued Oct. 17, 2023, in Japanese Patent Application No. 2022-187454 (with English-language Translation).
Chen Qiang et al., On the structures and bonding in boron-gold alloy clusters: B6Aun—and B6Aun (n=1-3), The Journal of Chemical Physics, Feb. 19, 2013, 138, 084306-1 to 084306-8.

* cited by examiner

METHOD FOR MANUFACTURING PRECIOUS METAL ALLOYS AND PRECIOUS METAL ALLOYS THUS OBTAINED

CROSS-REFERENCE TO RELATED APPLICATIONS

The present application is the national stage of international application PCT/EP2019/083802, filed on Dec. 5, 2019, and claims the benefit of the filing date of European Appl. No. 18210947.0, filed on Dec. 7, 2018.

TECHNICAL FIELD OF THE INVENTION

The present invention relates to a method for manufacturing precious metal alloys. The present invention further relates to such precious alloys. In particular, the present invention relates to a method for manufacturing light precious metal alloys obtained from gold, silver, platinum, palladium, ruthenium, rhodium or iridium. The light precious metal alloys concerned hereby are titratable, i.e. they are alloys whose ratio between the weight of precious metal in the composition of the alloy and the total weight of this alloy is determined by law.

BACKGROUND OF THE INVENTION

A metal alloy results from the combination, by melting, of a first metallic element with at least one second metallic element. The advantage of metal alloys lies in the fact that the properties, in particular the mechanical properties, of such alloys are enhanced compared to the mechanical properties of the metallic elements constituting same taken individually.

The mechanical properties of a metal can in particular be enhanced by deformation, in particular by work hardening; these mechanical properties can also be enhanced by a chemical approach, by adding one or more alloying elements to the base metal. These additions often also enhance the chemical properties such as the resistance of the base metal to corrosion.

The metal alloy technique is of particular interest in the case of precious metals such as gold. More specifically, gold is known to be easily deformed when cold, which is why it has been used since the end of the Neolithic Period to produce jewellery and finery as well as coins from Antiquity. Nonetheless, the ease with which gold can be deformed is also a drawback since a simple mechanical impact is all it takes to deform the jewellery produced using this noble metal. This is why efforts were made very early on to enhance the mechanical properties of gold by alloying it with other metallic elements; silver and copper are the two primary metals used for alloying gold and are known to improve the stiffness of gold.

Alloying gold with other metallic elements such as silver or copper produces metal alloys with a hardness that is greater than that of gold. Nonetheless, these gold alloys have the drawback of having a high density. This is why attempts have been made to alloy gold with metallic elements having a lower density.

Tests have already been carried out to attempt to alloy gold (Au) which is a heavy metal, i.e. a metal with a high density (about 19.3 g.cm$^{-3}$), with boron (B) which is a very light metal, i.e. with a low density (about 2.3 g.cm$^{-3}$). Nonetheless, attempts made to date to try to alloy gold and boron using conventional metallurgy techniques have all resulted in failure or, at best, resulted in very low boron dissolution rates, which do not allow for industrial production. The materials resulting from the combination of gold and boron were seen to be unstable and the production of solid titratable components such as 18-karat gold using this combination was shown to be impossible. These problems are in particular due to the fact that, when melting, the gold and boron cannot be mixed; more specifically, as a result of the high density thereof, gold tends to sediment at the bottom of the crucible, whereas boron, whose density is lower, floats.

The recent marketing of boron powders obtained by nanostructuring techniques has revived the interest in gold and boron alloys and, more generally, in all types of alloy formed between a precious metal (gold (Au), silver (Ag), platinum (Pt), palladium (Pd), ruthenium (Ru), rhodium (Rh) or iridium (Ir)) and boron (B).

Methods for manufacturing metal alloys using powder metallurgy technology procure materials that would be impossible to manufacture using conventional metallurgy techniques. This is of particular interest in cases where the metal used to form such a metal alloy is a titratable precious metal such as gold (Au), silver (Ag), platinum (Pt), palladium (Pd), ruthenium (Ru), rhodium (Rh) or iridium (Ir). Moreover, the metal alloys obtained using powder technology are both lighter and harder than the metal alloys obtained using conventional metallurgy approaches.

A type of nano-structured boron takes the form of a grey/black-coloured powder formed of particles whose dimensions lie in the range 5 nm to 12 nm and which are formed of a core constituted of $HfB_2$, of NiB, of CoB, of $YB_4$ or of $YB_6$ and whose structure is crystalline, and of a layer of amorphous boron, the thickness thereof being equal to several nanometres and which coats the core of these particles. These particles are agglomerated with one another to form three-dimensional structures, the dimensions thereof lying in the micrometric range and the specific surface area thereof being in the order of 700 m$^2$ for 1 g of powder.

SUMMARY OF THE INVENTION

A purpose of the present invention is to procure a method for manufacturing light precious metal alloys in particular for obtaining light alloys that are stable from a physical-chemical standpoint with which solid components can be produced. The present invention further relates to such light precious alloys.

For this purpose, the present invention relates to a method for manufacturing a part by alloying a precious metal with boron, the precious metal being selected from the group formed by gold, silver, platinum, palladium, ruthenium, rhodium and iridium, this method comprising the steps of:
  providing at least one quantity of precious metal reduced to powder form;
  providing a quantity of a nano-structured micrometric powder formed by aggregates of particles, these aggregates which constitute the nano-structured micrometric powder having dimensions within the micrometric range, these aggregates being themselves constituted of particles containing, at least in part, boron, and which have at least one geometrical value within the nanometric range responsible for the reactivity of the nano-structured micrometric powder;
  mixing the precious metal powder with the nano-structured micrometric powder and compacting this mixture of powders by applying a uniaxial pressure;

subjecting the mixture of precious metal powder and nano-structured micrometric powder to a spark plasma sintering or flash sintering treatment at a pressure that lies in the range 0.5 GPa to 10 GPa, or to a hot isostatic pressing (HIP) treatment at a pressure that lies in the range 80 bar to 2,200 bar, the treatment being carried out at a temperature that lies in the range 400° C. to 2,100° C. in order to obtain at least one precious metal/boron alloy ingot, and machining the precious metal/boron alloy ingot to obtain the desired part, or reducing the precious metal/boron alloy ingot to powder form by a micronisation treatment, and obtaining the desired part by treating the powder resulting from the micronisation treatment.

Thanks to these features, the method according to the invention procures precious metal/boron alloys which have both excellent mechanical properties and whose density is low. To the Applicant's knowledge, the method according to the invention offers, for the first time, the possibility of alloying, on an industrial scale, a component of a very low density, in this instance boron, with a precious metal, in particular gold, however not limited thereto, the density thereof being high. Thanks to the method of the invention, precious metal/boron alloys can be obtained which are stable from a physical-chemical standpoint, having excellent mechanical properties, and whose density is low. In a remarkable manner, in the method according to the invention, the precious metal selected and the boron particles are closely alloyed, without any segregation phenomenon between the two materials being observed at any time.

According to special embodiments of the invention:

in order to obtain the desired part, the powder resulting from the micronisation treatment is inserted into a mould and subjected to a uniaxial or isostatic pressure;

in order to obtain the desired part, the powder resulting from the micronisation treatment is subjected to a three-dimensional additive manufacturing treatment;

the three-dimensional additive manufacturing treatment is of the direct printing type;

the treatment by direct printing is selected from the group formed by selective laser melting (SLM) and E-beam melting;

the three-dimensional additive manufacturing treatment is of the indirect printing type;

the indirect printing treatment is selected from the group formed by Inkjetting, nanoparticle jetting (NPJ) and Digital Light Projecting (DLP).

According to another special embodiment of the invention, the manufacturing method further comprises the steps of:

mixing the powder resulting from the micronisation treatment of the precious metal/boron alloy ingot with a binder to obtain a feedstock;

producing a green body by subjecting the feedstock to an additive manufacturing injection or micro-injection;

obtaining a brown body by subjecting the green body to a step of eliminating the polymer binder, referred to as a debinding step, during which the green body is chemically treated then heat treated in a furnace to burn the residual polymer binder, this debinding step typically being carried out in gaseous phase in a nitric acid or oxalic acid atmosphere and at a temperature in the range 100° C. to 140° C.;

subjecting the brown body to a sintering treatment in a protected atmosphere and at a temperature in the range 700° C. to 1,800° C. to obtain the desired part.

According to another special embodiment of the invention, the manufacturing method further comprises the steps of:

mixing the powder resulting from the micronisation treatment of the precious metal/boron alloy ingot with a binder to obtain a feedstock;

producing a green body, the shape thereof corresponding to the desired work profile using an indirect additive manufacturing technique;

obtaining a brown body by subjecting the green body to a step of eliminating the polymer binder, referred to as a debinding step, during which the green body is chemically treated then heat treated in a furnace to burn the residual polymer binder, this debinding step typically being carried out in gaseous phase in a nitric acid or oxalic acid atmosphere and at a temperature in the range 100° C. to 140° C.;

subjecting the brown body to a sintering treatment in a protected atmosphere and at a temperature in the range 700° C. to 1,800° C. to obtain the desired part.

According to other special embodiments of the invention:

the additive manufacturing technique is selected from the group formed by Binder jetting, Solvent on Granulate jetting, FDM or micro-extrusion;

after the sintering treatment, the part resulting from the sintering step is subjected to a hot isostatic pressing (HIP) post-treatment step at a pressure that lies in the range 500 bar to 2,200 bar, and at a temperature that lies in the range 600° C. to 2,100° C.;

the binder is selected from the group formed by polyethylene glycol (PEG), cellulose acetate butyrate (CAB), nano-cellulose, corn starch, sugar, polylactic acid (PLA), polyethylene, polypropylene, synthetic or natural wax and stearic acid;

the precious metal is selected from the group formed by gold (Au), silver (Ag), platinum (Pt), palladium (Pd), ruthenium (Ru), rhodium (Rh) and iridium (Ir), and the nano-structured micrometric boron powder is selected from the group formed by NiB, CoB, $YB_4$ and $YB_6$;

25 wt % nano-structured micrometric boron powder is mixed with 75 wt % gold;

a first form of nano-structured micrometric boron powder well suited to the needs of the present invention takes the form of a black/brown-coloured powder, formed by particles whose dimensions lie in the range 25 to 999 nm and which are made of boron in proportions by weight of greater than 95%, the remainder being made of unavoidable impurities incorporated during synthesis, such as, in a non-limiting manner, carbon, nitrogen, oxygen, potassium, sodium, chlorine, iodine, caesium, lithium, rubidium and magnesium. The nano-structured micrometric boron powder may have a specific surface area of the nano-structured micrometric boron powder is at least 100 $m^2$ for 1 g of powder. One example of a nano-structured micrometric boron powder is given by the product marketed by Pavezyum under the reference PVZ nano Boron;

a second form of nano-structured micrometric boron powder well suited to the needs of the present invention corresponds to the material referred to by the name "nano-structured amorphous boron material", the features and conditions for obtaining same are described in the international patent application PCT WO2016207558A1. This is a nano-structured micrometric boron powder taking the form of particles whose dimensions do not exceed 25 nanometres and which are made of boron in proportions by weight of greater than or equal to 85%, the remainder being constituted by unavoidable impurities originating from the synthesis of the powder which are one or more of the following elements: lithium, sodium, potassium, rubidium, caesium, iodine, chlorine, bromine and fluorine. This nano-structured micrometric boron powder is obtained by synthesis by molten salt (SMS), this synthesis being carried out by a dry process, by a wet process or in an argon atmosphere;

a third form of nano-structured micrometric boron powder well suited to the needs of the present invention takes the form of a grey/black-coloured powder formed of particles whose dimensions lie in the range 5 nm to 12 nm and which are formed of a core constituted of $HfB_2$, of NiB, of CoB, of $YB_4$ or of $YB_6$ and whose structure is crystalline, and of a layer of amorphous boron, the thickness thereof being equal to several nanometres and which coats the core of these particles. These particles are agglomerated with one another to form aggregates, the dimensions thereof lying in the micrometric range and the specific surface area thereof being in the order of 700 $m^2$ for 1 g of powder. This nano-structured micrometric boron powder is obtained by synthesis by molten salt (SMS), this synthesis being carried out by a dry process, by a wet process or in an argon atmosphere;

the gold/boron alloy according to the method of the invention allows an 18-karat gold to be obtained that has a density in the range 6.6 to 7 $g/cm^3$.

The particle size is determined by one of the following techniques: transmission electron microscopy, scanning electron microscopy, dynamic light scattering or X-ray diffraction (using the Scherrer equation as regards crystalline materials).

The specific surface area of the powders is determined using the nitrogen adsorption technique, according to the Brunauer-Emmet-Teller (BET) method.

Finally, the density is determined using a pycnometer.

DETAILED DESCRIPTION OF ONE METHOD OF IMPLEMENTING THE INVENTION

The present invention was drawn from the general inventive idea consisting of procuring a titratable precious metal alloy that is stable from a physical-chemical standpoint and which has excellent mechanical properties.

For this purpose, the present invention relates to a method for manufacturing a part by alloying a precious metal with boron, the precious metal being chosen from the group formed by gold, silver, platinum, palladium, ruthenium, rhodium and iridium, this method comprising the steps of:
providing at least one quantity of precious metal reduced to powder form;
providing a quantity of a nano-structured micrometric powder formed by aggregates of particles, these aggregates which constitute the nano-structured micrometric powder having dimensions within the micrometric range, these aggregates being themselves constituted of particles containing, at least in part, boron, and which have at least one geometrical value within the nanometric range responsible for the reactivity of the nano-structured micrometric powder;
mixing the precious metal powder with the nano-structured micrometric powder and compacting this mixture of powders by applying a uniaxial pressure;
subjecting the mixture of precious metal powder and nano-structured micrometric powder to a spark plasma sintering or flash sintering treatment at a pressure that lies in the range 0.5 GPa to 10 GPa, or to a hot isostatic pressing (HIP) treatment at a pressure that lies in the range 80 bar to 2,200 bar, the treatment being carried out at a temperature that lies in the range 400° C. to 2,100° C. in order to obtain at least one precious metal/boron alloy ingot, and
machining the precious metal/boron alloy ingot to obtain the desired part, or
reducing the precious metal/boron alloy ingot to powder form by a micronisation treatment, and obtaining the desired part by treating the powder resulting from the micronisation treatment.

Once the precious metal/boron alloy ingot obtained by implementing the method according to the invention has been micronised, a first possibility for obtaining the desired solid part consists of inserting the powder resulting from the micronisation treatment into a mould and of subjecting this mould to a uniaxial or isostatic pressure.

Once the precious metal/boron alloy ingot obtained by implementing the method according to the invention has been micronised, a second possibility for obtaining the desired solid part consists of subjecting the powder resulting from the micronisation treatment to a three-dimensional additive manufacturing treatment.

The three-dimensional additive manufacturing treatment can be of the direct printing type. The available three-dimensional additive manufacturing techniques of the direct type are selective laser melting (SLM) and E-beam melting.

The three-dimensional additive manufacturing treatment can be of the indirect printing type. The available three-dimensional additive manufacturing techniques of the indirect type are:
inkjetting: the powder resulting from the micronisation treatment of the precious metal/boron alloy ingot is dispersed in the ink. The ink is printed layer after layer, each layer being hardened by exposure to the rays of a light source for example UV light before depositing the subsequent layer.
nanoparticle jetting (NPJ): this technique, in particular developed by XJet, is similar to liquid inkjetting, with the exception that the ink is made of suspended nanoparticles resulting from the micronisation treatment. The suspension is then sprayed and dried layer by layer.
Digital Light Projecting (DLP): this technique consists of projecting by reflection on a mirror, the image of the part to be structured on a powder bed containing the powder particles resulting from the micronisation treatment dispersed in a photopolymer.

According to another special embodiment of the invention, after having mixed the powder resulting from the micronisation treatment of the precious metal/boron alloy ingot with a binder to obtain a feedstock, a green body is produced, the shape thereof corresponding to the desired work profile by subjecting the feedstock either to an injection or micro-injection, or to an additive manufacturing technique.

The available indirect additive manufacturing techniques include:
Binder jetting: this technique consists of spraying an inkjet containing a solvent and a binder on a powder bed in which the powder particles resulting from the micronisation treatment are dispersed.
Solvent on Granulate jetting: this technique consists of spraying a solvent on a granulate bed, each of these granulates being formed by a plurality of powder particles resulting from the micronisation treatment agglomerated with one another by means of a binder. The dimensions of these granulates are in the order of 10 µm to 50 µm. The desired part is printed, layer by layer, with the granulates agglomerating thanks to the binder. Once the desired part has been printed, it is subjected to a debinding operation in order to eliminate the solvent, and is then sintered.

FFD (Fused Filament Deposition): filaments whose dimensions lie in the millimetric range are produced by agglomerating the powder particles resulting from the micronisation treatment by means of a binder. These filaments are then heated and the material of which they are made escapes from a nozzle, the diameter whereof is in the order of 40 µm and allow the desired part to be printed in three dimensions.

micro-extrusion.

The binder is selected from the group formed by polyethylene glycol (PEG), cellulose acetate butyrate (CAB), nano-cellulose (nanometric derivative of cellulose), corn starch, sugar, polylactic acid (PLA), polyethylene, polypropylene, synthetic or natural wax and stearic acid.

A brown body is obtained by subjecting the green body to a step of eliminating the polymer binder referred to as a debinding step during which the green body is chemically treated then heat treated in a furnace to burn the residual polymer binder, this debinding step typically being carried out in gaseous phase in a nitric acid or oxalic acid atmosphere and at a temperature in the range 100° C. to 140° C.

Finally, the brown body is subjected to a sintering treatment in a protected atmosphere and at a temperature in the range 700° C. to 1,800° C. to obtain the desired part.

It should be noted that, after the sintering treatment, the part resulting from the sintering step can be subjected to a hot isostatic pressing (HIP) post-treatment step at a pressure that lies in the range 500 bar to 2,200 bar, and at a temperature that lies in the range 600° C. to 2,100° C.

According to specific embodiments of the invention, the precious metal is chosen from the group consisting of gold (Au), silver (Ag), platinum (Pt), palladium (Pd), ruthenium (Ru), rhodium (Rh) and iridium (Ir). The boron is selected from the group formed by:

boron which takes the form of a black/brown-coloured powder, formed by particles whose dimensions lie in the range 25 to 999 nm and which are made of boron in proportions by weight of greater than 95%, the remainder being made of unavoidable impurities incorporated during synthesis, such as, in a non-limiting manner, carbon, nitrogen, oxygen, potassium, sodium, chlorine, iodine, caesium, lithium, rubidium and magnesium. One example of such a material is given by the product marketed by Pavezyum under the reference PVZ nano Boron;

boron whose features and conditions for obtaining same are described in the international patent application PCT WO2016207558A1. This boron takes the form of a powder formed by particles whose dimensions do not exceed 25 nanometres and which are made of boron in proportions by weight of greater than or equal to 85%, the remainder being constituted by unavoidable impurities originating from the synthesis of the powder which are one or more of the following elements: lithium, sodium, potassium, rubidium, caesium, iodine, chlorine, bromine and fluorine.

grey/black-coloured nano-structured micrometric boron powder formed of particles whose dimensions lie in the range 5 nm to 12 nm and which are formed of a core constituted of $HfB_2$, of $NiB$, of $CoB$, of $YB_4$ or of $YB_6$ and whose structure is crystalline, and of a layer of amorphous boron, the thickness thereof being equal to several nanometres and which coats the core of these particles. These particles are agglomerated with one another to form aggregate structures, the dimensions thereof lying in the micrometric range and the specific surface area thereof being in the order of 700 $m^2$ for 1 g of powder. To obtain the desired material, one ratio that procures good results for the gold and boron mixture is 25 wt % nano-structured micrometric boron powder and 75 wt % gold.

In particular, the present invention relates to a method for manufacturing light precious metal alloys obtained from gold, silver, platinum, palladium, ruthenium, rhodium or iridium. The light precious metal alloys concerned hereby are titratable, i.e. they are alloys whose ratio between the weight of precious metal in the composition of the alloy and the total weight of this alloy is determined by law. A remarkable precious metal alloy obtained thanks to the method of the invention is an 18-karat gold/boron alloy with a density in the range 6.6 to 7 $g/cm^3$. The products obtained are $AuB_6$ and $Au_2B_{12}$, the latter component being capable of containing $AuB_2$ inclusions.

It goes without saying that the present invention is not limited to the embodiment described above and that various simple alternatives and modifications can be considered by a person skilled in the art without leaving the scope of the invention as defined by the accompanying claims.

It should in particular be noted that it has been decided to qualify the boron powders concerned hereby as "micrometric" and "nano-structured" insofar as the particle aggregates constituting these powders have dimensions within the micrometric range, these aggregates being themselves constituted of particles essentially containing boron and which have at least one geometric value within the nanometric range responsible for the reactivity of the nano-structured micrometric powder. The term geometric value responsible for reactivity is understood to mean a geometric value such as the specific surface area, the surface roughness, or even the area of one face of the boron-containing particles which is located in the nanometric range. Thus, according to the invention, although the boron-containing particles have at least one geometrical value within the nanometric range, other geometrical dimensions of these particles can lie in the micrometric range, without this affecting the reactivity of these boron-containing particles. It should also be noted that, throughout the present description, the term nano-structured micrometric powder is understood to mean a material formed by aggregates which extend in the micrometric range and which result from the agglomeration of particles essentially containing boron, and at least one dimension thereof lying in the nanometric range.

It should also be noted that, although the present description essentially concerns a binary precious metal alloy formed of gold and boron, the present invention is not limited to such an example and also includes precious metal alloys that are, for example, ternary or quaternary. For the purposes of illustration, according to the invention, particles of nano-respective structured micrometric boron powder can be mixed with gold in the weight percentages of 75 wt % and 23 wt %, with the remainder being constituted by micronised nickel.

It should also be noted that the gold used within the scope of this invention is 24-karat ½ bright yellow gold and that the dimensions of the particles obtained by hammering this gold and which form the gold powder used within the scope of the present invention are less than 50 µm.

It should also be noted that the nano-structured micrometric boron particles concerned hereby are in particular known from the thesis by Remi
Grosjean, entitled "Boron-based nanomaterials under extreme conditions", pages 70 et seq., presented publicly on 17 Oct. 2018 at Université Pierre et Marie Curie—Paris VI, 2016. These nano-structured micrometric boron particles are obtained by synthesis in molten salts (SMS). This synthesis consists of placing metal and boron in the presence of the reactive substances in a salt mixture. When the mixture is heated, the salts melt, thus acting as a liquid medium. The typical synthesis of nano-structured borides in molten salts involves a metal source (usually a chloride $MCl_x$), and sodium borohydride. Sodium borohydride is used both as a boron source and as a reducing agent in order to obtain $M^0$ in the reaction medium. The use of such precursors and of lithium and potassium salts requires working under an inert atmosphere due to the sensitivity of these chemicals to water and/or oxygen. As a result, the precursors are handled and mixed in a laboratory glove box under an argon inert atmosphere. The synthesis itself is carried out under an argon atmosphere and not under a nitrogen atmosphere, since the nitrogen is capable of reacting with certain boron species and of yielding boron nitride.

The requirements for the experimental set-up are thus the following:
- ensuring that the reaction medium is kept under an argon atmosphere; this objective is achieved by using a quartz tube which is stable at the working temperatures and which is connected to a Schlenk line.
- heating in a temperature range of between 300° C. and 1,000° C. The area of the quartz tube in which the temperature is homogeneous is about 8 cm wide, i.e. it is large enough to allow homogeneous heating of the reaction medium, and low enough to allow the salt vapours to condense to prevent solvent loss during the reaction. The heating rate is 10° C./minute.
- preventing side reactions between the reaction medium and the quartz tube. Vitreous carbon is chemically inert under an argon atmosphere and is thus used as a crucible. The crucible is long enough to allow the salt vapours to condense in the low-temperature area of the furnace.
- in some cases, the reaction mixture must be stirred. This takes place using a rotating vitreous carbon rod.

After the reaction, the reaction medium is left to cool naturally. Metal borides are obtained in the form of nanoparticles dispersed in a volume of frozen salts. To remove the salts, washing/centrifugation cycles are carried out in a polar solvent such as water or methanol. The adjustable parameters notably include the synthesis temperature, the dwell time and the initial ratio between the metal and boron sources.

The aforementioned thesis particularly concerns two nano-structured metal borides: hafnium diboride and calcium hexaboride. $CaB_6$ and $HfB_2$ have no phase transition under a high temperature and high pressure and are thus well suited for studying crystallisation of the amorphous phase in which the boride particles are embedded.

Two mixtures of eutectic salts, i.e. LiCl/KCl and LiI/KI, were used. The first syntheses of $HfB_2$ was conducted in a LiCl/KCl (45/55 wt %) eutectic mixture, for which the melting point is about 350° C. $HfCl_4$ and $NaBH_4$ are used in a Hf:B=1:4 molar ratio and are mixed with the salt solution. After heating at 900° C. for 4 hours, cooling, washing with deionised water and drying under a vacuum, a black powder is obtained. The X-ray diffraction pattern of this powder shows that $HfB_2$ is the only crystalline phase and exhibits no reflections corresponding either to the solvent salts or to the sodium chloride which can occur as side products of the boride formation. Moreover, the $HfB_2$ structure is typical of that of diborides with metal atoms intercalated between boron sheets exhibiting a honeycomb structure.

According to the Scherrer equation, the particle size is 7.5 nm. This is confirmed by transmission electron microscopy which shows that the particle size lies in the range 5-12 nm. Other images obtained by SAED, FFT and HRTEM confirm that $HfB_2$ is the sole crystalline phase in the material and that only the nanoparticles are crystalline.

Transmission electron microscopy also shows that the particles are surrounded by an amorphous shell, the thickness thereof lying in the range 2 to 4 nm. The particles are present in the form of inclusions inside a three-dimensional amorphous matrix. The gaps between the particles are filled with an amorphous matrix, the thickness thereof lying in the range 2 to 4 nm. As a result, the matrix is also nano-structured and the material can be described as a nanocomposite.

The invention claimed is:

1. A method for manufacturing a part by alloying gold with boron, the method comprising:
   mixing 75 wt % gold in powder form with 25 wt % of a powder of aggregates comprising boron particles, the particles being in a nanometric geometric size, the nanometric geometric size being responsible for a reactivity of the powder, to obtain a mixture;
   compacting the mixture by applying a uniaxial pressure;
   subjecting the mixture (i) to a spark plasma sintering or flash sintering treatment at a pressure in a range of from 0.5 GPa to 10 GPa and at a temperature in a range of from 400° C. to 2,100° C., or (ii) to a hot isostatic pressing (HIP) treatment at a pressure in a range of from 80 bar to 2,200 bar and at a temperature in a range of from 400° C. to 2,100° C., to obtain an ingot of an alloy comprising gold and boron; and
   machining the ingot to obtain the part, or micronizing the ingot to an ingot powder and treating the ingot powder to obtain the part,
   wherein the boron particles are
   (i) first boron particles having dimensions in a range of from 25 to 999 nm and comprising boron in greater than 95 wt. % with a remainder of unavoidable impurities incorporated during synthesis comprising carbon, nitrogen, oxygen, potassium, sodium, chlorine, iodine, cesium, lithium, rubidium, and/or magnesium, or
   (ii) second boron particles having dimensions not exceeding 25 nm and comprising boron in at least 85 wt. % with a remainder of unavoidable impurities originating from synthesis comprising lithium, sodium, potassium, rubidium, cesium, iodine, chlorine, bromine, and/or fluorine; or
   (iii) third boron particles having dimensions in a range of from 5 to 12 nm, having a crystalline structure, and comprising $HfB_2$, NiB, CoB, $YB_4$, or $YB_6$ as the core and an amorphous boron layer coating the core.

2. The method of claim 1, wherein, to obtain the part, the micronizing is performed on the ingot to obtain the ingot powder, and the ingot powder is inserted into a mold and subjected to a uniaxial or isostatic pressure.

3. The method of claim 1, wherein, to obtain the part, the micronizing is performed on the ingot to obtain the ingot powder, and the ingot powder is subjected to a three-dimensional additive manufacturing treatment.

4. The method of claim 1, comprising the micronizing of the ingot to obtain the ingot powder, the further comprising:
mixing the ingot powder with a binder, to obtain a feedstock;
subjecting the feedstock either to an injection or micro-injection, or to an additive manufacturing technique, to obtain green body having a shape corresponding to a part profile;
debinding the green body by chemically treating, then heat treating in a furnace to burn residual binder, the debinding being carried out in gaseous phase in a nitric acid or oxalic acid atmosphere and at a temperature in a range of from 100° C. to 140° C., to obtain a brown body from which the binder is eliminated; and
sintering the brown body in a protected atmosphere and at a temperature in a range of from 700° C. to 1,800° C. to obtain the part.

5. The method of claim 1, wherein the gold is 24-karat yellow gold, and wherein the gold is in the form of particles having dimensions of less than 50 μm.

6. The method of claim 1, wherein the third boron particles (iii) are present and comprise the $HfB_2$.

7. The method of claim 1, wherein the boron particles are the first boron particles (i).

8. The method of claim 1, wherein the third boron particles (iii) are present and comprise the NiB.

9. The method of claim 1, wherein the third boron particles (iii) are present and comprise the CoB.

10. The method of claim 1, wherein the third boron particles (iii) are present and comprise the $YB_4$.

11. The method of claim 1, wherein the third boron particles (iii) are present and comprise the $YB_6$.

12. The method of claim 3, wherein the three-dimensional additive manufacturing treatment is selected from the group consisting of selective laser melting and electron beam melting.

13. The method of claim 3, wherein the three-dimensional additive manufacturing treatment is inkjetting.

14. The method of claim 4, wherein the green body is produced by subjecting the feedstock to the additive manufacturing technique and the additive manufacturing technique is selected from the group consisting of binder jetting, solvent on granulate jetting, fused deposition modeling, or micro-extrusion.

15. The method of claim 4, further comprising, after the sintering:
hot isostatically pressing the part post-treatment at a pressure in a range of from 500 bar to 2,200 bar, and at a temperature in a range of from 600° C. to 2,100° C.

16. The method of claim 4, wherein the binder comprises polyethylene glycol (PEG), cellulose acetate butyrate (CAB), nano-cellulose, corn starch, sugar, polylactic acid, polyethylene, polypropylene, synthetic wax, natural wax, or stearic acid.

17. The method of claim 14, further comprising, after the sintering treatment:
hot isostatically pressing the part post-treatment at a pressure in a range of from 500 bar to 2,200 bar, and at a temperature in a range of from 600° C. to 2,100° C.

18. The method of claim 5, wherein the third boron particles (iii) are present and comprise $HfB_2$.

19. The method of claim 5, wherein the third boron particles (iii) are present and comprise the NiB.

20. The method of claim 5, wherein the third boron particles (iii) are present and comprise the CoB.

21. The method of claim 5, wherein the third boron particles (iii) are present and comprise the $YB_4$.

22. The method of claim 5, wherein the third boron particles (iii) are present and comprise the $YB_6$.

23. The method of claim 18, wherein the boron particles are the third boron particles (iii),
wherein the amorphous boron layer coats the core and has a thickness in a range of from 2 to 4 nm, and
wherein the particles are agglomerated with one another to form three-dimensional structures having dimensions in a micrometric range.

24. The method of claim 6, wherein the boron particles are the third boron particles (iii),
wherein the amorphous boron layer coats the core and has a thickness in a range of from 2 to 4 nm, and
wherein the third boron particles are agglomerated with one another to form three-dimensional structures, the dimensions of which are in a micrometric range.

25. The method of claim 24, wherein the powder of the aggregates has a specific surface area of 700 $m^2/g$.

26. The method of claim 7, wherein the powder of the aggregates has a specific surface area of at least 100 $m^2/g$.

* * * * *